(12) United States Patent
Medl et al.

(10) Patent No.: US 6,209,006 B1
(45) Date of Patent: Mar. 27, 2001

(54) POP-UP DEFINITIONS WITH HYPERLINKED TERMS WITHIN A NON-INTERNET AND NON-SPECIFICALLY-DESIGNED-FOR-HELP PROGRAM

(75) Inventors: Robert E. Medl, San Jose; Lindsay Richard Bennion, Hollister; Jingwoan Chang, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/954,850

(22) Filed: Oct. 21, 1997

(51) Int. Cl.[7] ............................. G06F 15/00; G06F 13/00
(52) U.S. Cl. ............................. 707/501; 345/336
(58) Field of Search ............................. 707/501, 500, 707/513, 104, 532, 526; 345/146, 352–353, 347, 336–337, 302, 326

(56) References Cited

U.S. PATENT DOCUMENTS

| | | | | |
|---|---|---|---|---|
| 5,175,812 | * | 12/1992 | Krieger | 395/156 |
| 5,477,447 | * | 12/1995 | Luciw et al. | 364/419.08 |
| 5,493,658 | | 2/1996 | Chiang et al. | 345/336 |
| 5,742,768 | * | 4/1998 | Gennaro et al. | 295/200.33 |
| 5,897,635 | * | 4/1999 | Torres et al. | 707/10 |
| 5,920,855 | * | 7/1999 | Aggarwal | 707/3 |

OTHER PUBLICATIONS

Person et al., Using Word Version 6 for Windows, Que, 54, 68, 210, 212, 380, and 995, 1993.*

* cited by examiner

*Primary Examiner*—Joseph H. Feild
*Assistant Examiner*—Alford W. Kindred
(74) *Attorney, Agent, or Firm*—Lacasse & Associates; Randy W. Lacasse; Ray Strimaitis, Esq.

(57) ABSTRACT

Hyperlinks within an application program interface enable selective, non-intrusive, recall of help functions, such as definitions of critical terms located within a textual or graphical interface panel. Elements of a user interface for an application program are predefined as help functions by the programmer or developer. These predefined help functions are then hyperlinked to the specified predefined element. When a user traverses the interface, highlighted elements corresponding to the predefined help functions may be selected by a mouse or mouse-type function. Upon selection of a highlighted hyperlinked element, a help window appears providing definitions, functional instructions, etc.

14 Claims, 3 Drawing Sheets

POP-UP DEFINITIONS WITH HYPERLINKED TERMS WITHIN A NON-INTERNET AND NON-SPECIFICALLY-DESIGNED-FOR-HELP PROGRAM

RELATED MATERIALS

This application is related to the following co-pending application which is hereby incorporated by reference:

GUI GUIDE FOR DATA MINING. Ser. No. 08/955,402 filed Oct. 21, 1997.

BACKGROUND OF THE INVENTION

1. Field of Invention

The present invention relates generally to the field of embedded help functions within computer applications. More specifically, the present invention relates to a system and method using hyperlinked help functions within non-Internet and non-help programs.

2. Discussion of Prior Art

Throughout the prior art various methods have been developed attempting to provide a help function within a computerized program to assist the user in understanding the functions of the program. A standard menu located within Windows®-based application interfaces is Help. The user, upon facing uncertainty about a function within the Windows®-based program, selects the Help menu. Within this Help window, alphabetic or contextual help screens may be selected. Selected help sections produce informational details regarding the selected topic.

Upgrades to the above help system have been made to include help functions such as bubble, contextual or intelligent word association text strings. Bubble help displays help sequences directly on the screen as various preselected sections are traversed. Contextual help displays help for a known function within the framework the user is working, at the time help is requested. The contextual help opens a separate GUI system opened to the appropriate location to provide help relative to the control that had focus when help was requested. Intelligent word association uses free-form textual input by the user to derive the closest estimate of the problem to be solved or the specific help actually being requested.

Each of the above help systems provides the user with a limited amount of information. The prior art help systems, however, fail to provide the user with a help function which is part of the primary user interface for the application program itself, which is non-intrusive, provides an immediate help function and where the user knows, in advance of selection, that the information provided will specifically correlate with the help information needed. In addition, while bubble-type help does provide instant help functions and is typically very brief (<=3 words), it fails to enable the user to selectively disregard using such help, i.e. the help bubbles are either on or off, but not selectively activated. Bubble help typically automatically appears over other displayed information or within a status bar. Such continuous help functions may be regarded as distractive by the user. What is needed is a help function which is immediate, requires no alphanumeric typing or searching input, and is selectively disregarded by the user.

Whatever the precise merits, features and advantages of the above cited references, none of them achieves or fulfills the purposes of the present invention. Accordingly, it is an object of the present invention to provide for a primary interface built-in help function.

It is another object of the present invention to provide for a hypertext-linked help function.

It is another object of the present invention to provide for a non-intrusive help function.

It is further an object of the present invention to provide for a help function not requiring additional keyed input by the user.

These and other objects are achieved by the detailed description that follows.

SUMMARY OF THE INVENTION

The present invention improves on the prior art and eliminates many problems associated with the prior art including, but not limited to, those previously discussed above.

The use of hyperlinks within an application program interface enables selective, non-intrusive, recall of help functions such as definitions of critical terms located within a textual or graphical interface panel. Elements of a user interface for an application program are predefined as help functions by the programmer or developer. These predefined help functions are then hyperlinked to the specified predefined element. When a user traverses the interface, highlighted elements corresponding to the predefined help functions may be selected by a mouse or mouse-type function. Upon selection of a highlighted hyperlinked element, a help window appears providing definitions, functional instructions, etc.

DETAILED DESCRIPTION OF THE PRESENT INVENTION

Figures 1A, 1B:
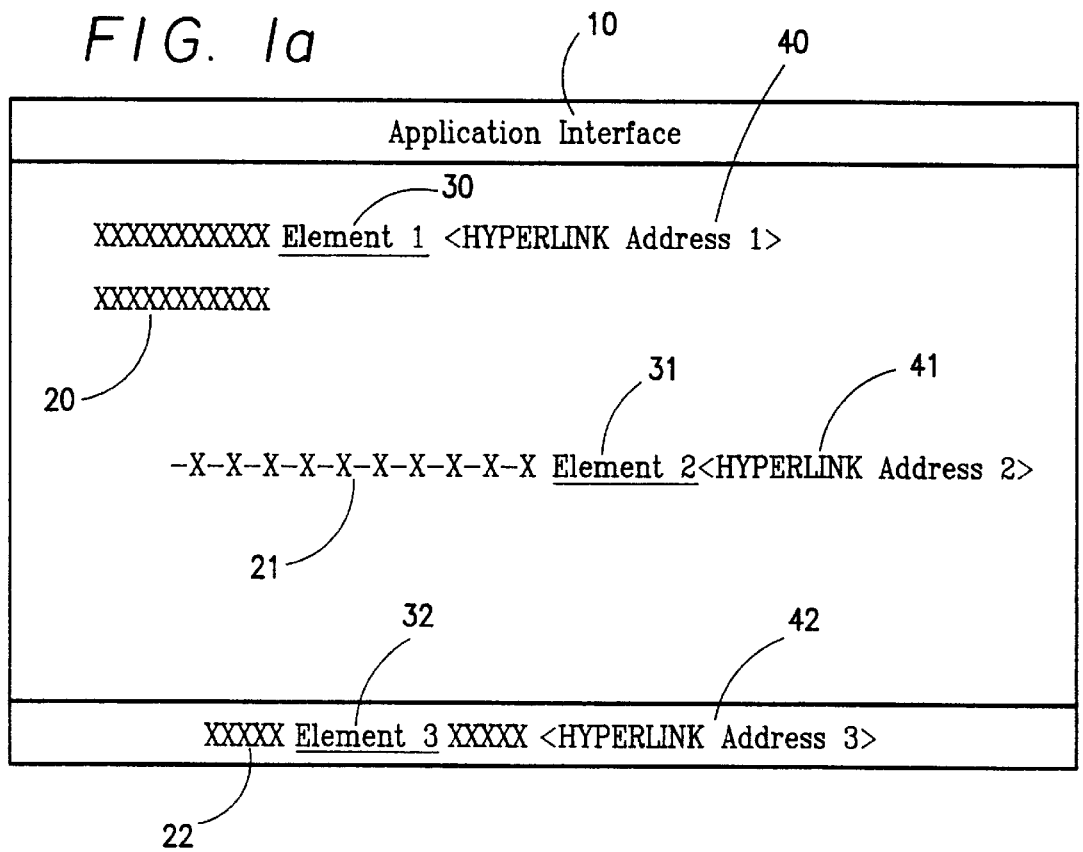
FIGS. 1a and 1b, in combination, illustrate a generalized application interface showing the hyperlinked help function of the present invention.

FIG. 1a illustrates a generalized application interface 10. Within the interface displayed to the user on the CRT are various elements of interest 30–32, which are highlighted to enable the user to visually note areas containing additional information which might be helpful to the user to create a better understanding of a definition of the term highlighted or function thereof. Each element has a hyperlink address 40–42 linking the specified highlighted element to a definition or other related information 71–73 in an associated entry within table 11 (FIG. 1b).

Figure 2:
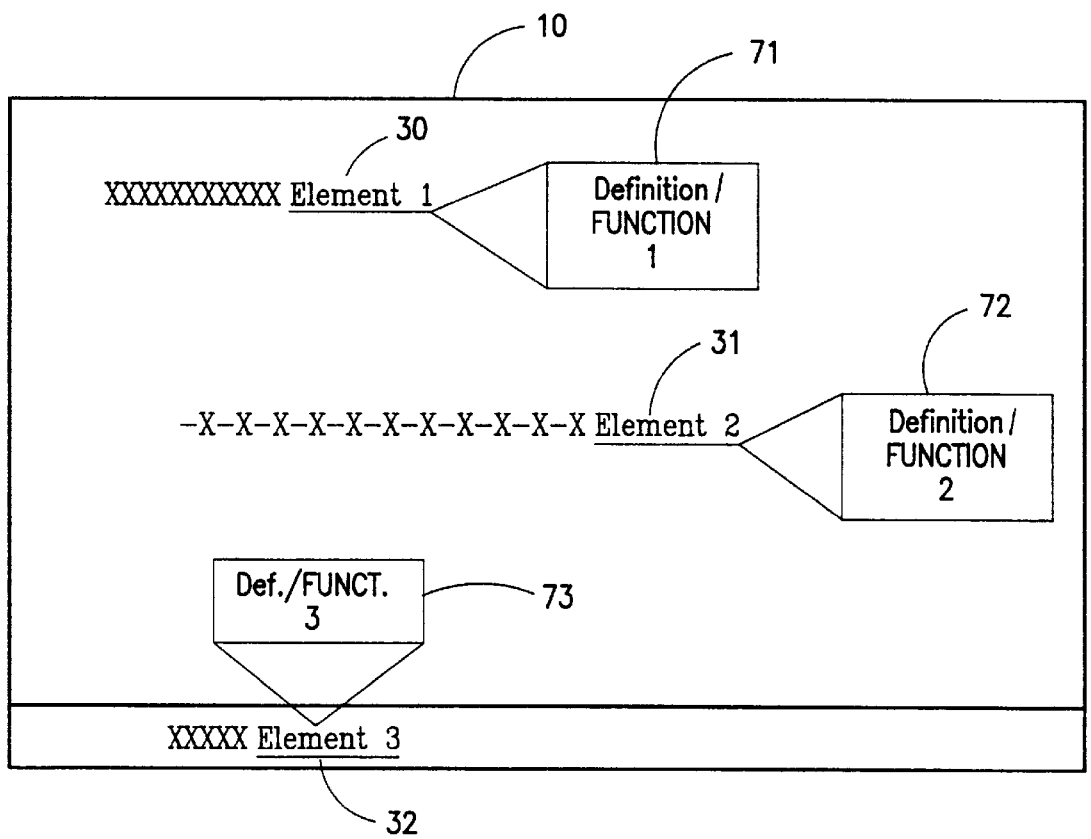
FIG. 2 illustrates the application interface of FIGS. 1a and 1b with highlighted elements selected and pop-up help windows displayed.

A user selects particular elements of interest by selecting the element using a click of a mouse or equivalent user input function. The selection of an element retrieves the definition/function 71–73 located in table 11. FIG. 2 illustrates the return of a pop-up representation of the definition/function found in table 11.

What separates the present invention from the prior art is the ability to selectively retrieve immediate help functionality without having to stray from the interface of the application program itself. For instance, in Windows® help features, the user must focus his attention to the help menu, open the help function, provide some keyboard or other type of user input to search help categories. Once the useful information is retrieved (if available), the user must then return to the section previous to the help request. For bubble-type help functions, the user is continuously presented with help functions without selective enablement, therefore possibly creating a constant distraction. In addition, the user, in the above prior art help systems, does not know in advance if any help function will be available for a particular question at hand. Much time can be wasted scanning and searching help directories for related help, often times without success. The present invention enables the user to identify, in advance, by noting highlighted elements, whether help information is available.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 3:
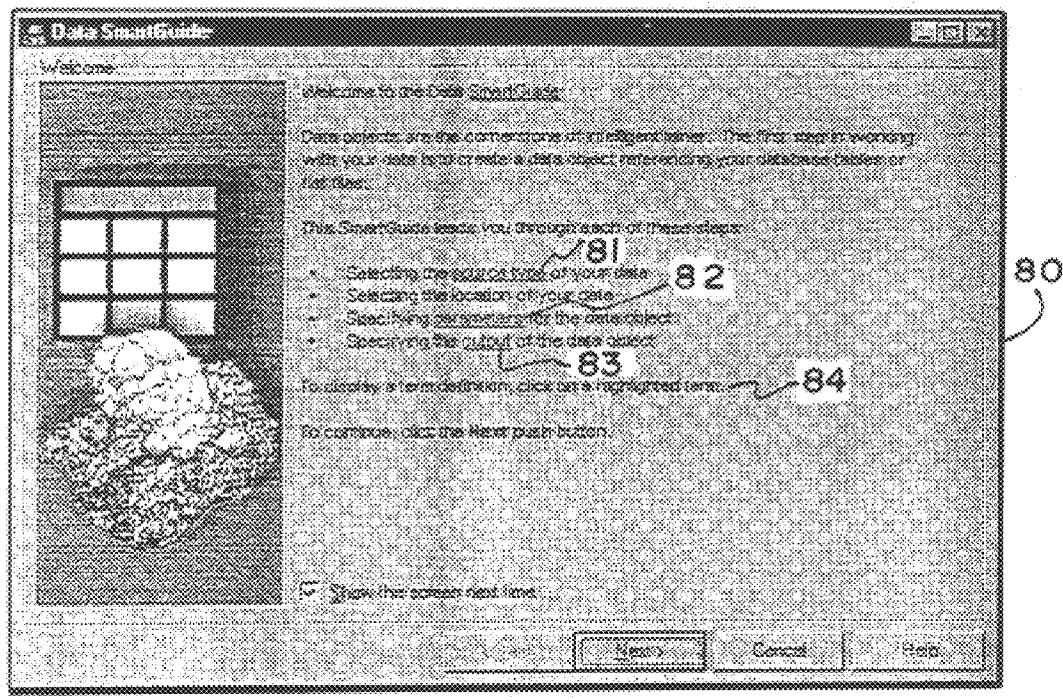
FIG. 3 illustrates an Intelligent Data Mining interface of the preferred embodiment.

FIG. 3 illustrates a specific implementation of the present invention using the application interface as fully described in co-pending application entitled, "GUI GUIDE FOR DATA MINING."

FIG. 3 illustrates a DATA SMART GUIDE welcome interface screen. Of specific interest is the plurality of highlighted (underlined for emphasis) terms 81–83: source type; parameters and output. Line 84 informs the user "To display a term definition, click on a highlighted term". Upon selection of a highlighted term, a pop-up window (not shown) providing the definition will be displayed as retrieved from the hyperlinked data contained within table 11.

Figure 4:
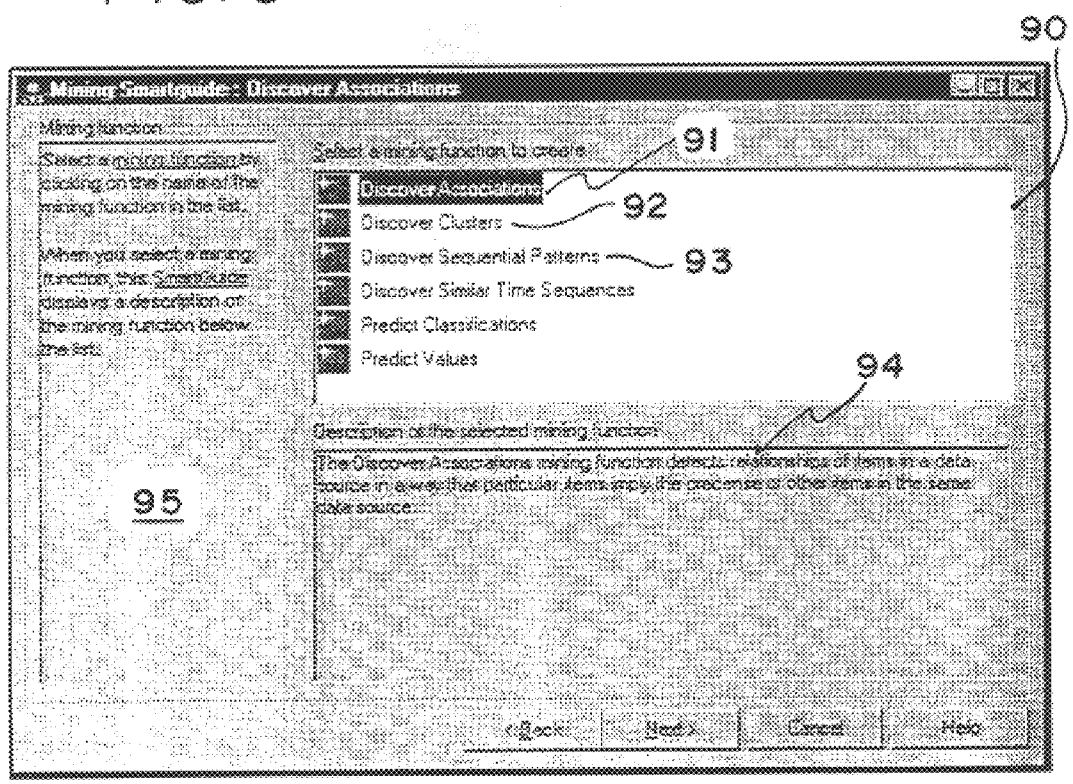
FIG. 4 illustrates an additional level of embedded help with the Intelligent Data Mining interface of FIG. 3.

FIG. 4 illustrates a secondary implementation of the present invention using the application interface as fully described in co-pending application entitled, "GUI GUIDE FOR DATA MINING". In this embodiment, not only is pop-up hyperlinked help available for selected terms located within window 95, but also for selectable data structures 91–93 located within window 90. As a user traverses data choices 91–93, a description of their functions appears within dialog box 94.

The above help system and its individually described functional elements are implemented in various computing environments. For example, the present invention may be implemented on a conventional IBM PC or equivalent, multi-nodal system (e.g. LAN) or networking system. All programming, mining algorithms, GUIs, display panels and dialog box templates, metadata and data related thereto are stored in computer memory, static or dynamic, and may be retrieved by the user of the Intelligent Mining system in any of: conventional computer storage, display (i.e. CRT) and/or hardcopy (i.e. printed) formats. The programming of the present invention may be implemented by one of skill in the art of object-oriented programming.

CONCLUSION

A system and method has been shown in the above embodiments for the effective implementation of a pop-up definitions with hyperlinked terms within a non-Internet program. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific hyperlinked addressing schemes.

What is claimed is:

1. A computer-based method of embedding help functions directly into a program interface comprising:

selecting one or more elements within a program interface, said one or more elements including any of alphanumeric or interface objects visually appearing within one or more windows of said program interface;

providing one or more help functions for each of said selected elements, said help functions including any of definitions for alphanumeric text or descriptions of use for selected interface objects within said program interface;

storing said provided help functions in computer storage;

providing a hyperlink between said selected one or more elements and said associated help function located in said computer storage;

highlighting said one or more selected elements to visually indicate said available help functions;

creating a display window to retain said help function for each of said selected elements, and wherein, upon selection of a highlighted element, said hyperlink retrieves said associated help function from said storage for display within said display window.

2. A computer-based method of extracting embedded help functions directly from a program interface as per claim 1, wherein said interface program is a data mining interface.

3. A computer-based method of extracting embedded help functions directly from a program interface as per claim 1, wherein said interface program contains embedded help functions for multiple windows.

4. A computer-based method of extracting embedded help functions directly from a program interface as per claim 3, wherein said multiple windows comprise a first instructional level window and a second data object level window.

5. A computer-based method of extracting embedded help functions directly from a program interface as per claim 4, wherein said help functions for each level windows are displayed separately.

6. A computer-based method of extracting embedded help functions directly from a program interface as per claim 3, wherein said program interface comprises a data mining interface.

7. A computer-based graphical user interface with an embedded help function comprising:

a plurality of development templates including one or more windows;

one or more alphanumeric sequences or graphical objects located within at least one of said one or more windows;

highlighted selections located within said one or more alphanumeric sequences or graphical objects, said highlighted sections visually indicating that preselected additional information is available;

a hyperlink to said highlighted selections;

said preselected additional information comprising a help function definition associated with said highlighted sections, said help function definition stored in computer storage and accessible by said hyperlink, and wherein said hyperlink enables retrieval of said help function definition by interactive selection of said highlighted sections.

8. A computer-based graphical user interface with embedded help function as per claim 7, wherein said graphical user interface is a data mining interface.

9. A computer-based graphical user interface with embedded help function as per claim 7, wherein said retrieved help function definitions for said highlighted selections in each of said one or more windows are displayed separately.

10. A computer-based graphical user interface with embedded help function as per claim 7, wherein said graphical user interface is not a direct Internet application.

11. A data mining computer-based product including a user interface with embedded help function comprising:

a plurality of data mining object development templates including one or more windows;

one or more alphanumeric sequences located within at least one of said one or more windows;

highlighted selections located within said one or more alphanumeric sequences;

a hyperlink to said highlighted selections;

a help function definition associated with said highlighted sections, and wherein said hyperlink enables retrieval of said help function definition by interactive selection of said highlighted text.

12. A computer program product for use with a graphics display device, said computer program product comprising:

a computer usable medium having computer readable program code means included in said medium:

said computer readable program code means embodying:

a plurality of development templates including one or more windows;

one or more alphanumeric sequences located within at least one of said one or more windows;

highlighted selections located within said one or more alphanumeric sequences;

a hyperlink to said highlighted selections;

a help function definition associated with said highlighted sections, and wherein said hyperlink enables retrieval of said help function definition by interactive selection of said highlighted text.

13. A computer program product for use with a graphics display device as per claim 12, wherein said graphical user interface is a data mining interface.

14. A computer program product for use with a graphics display device as per claim 12, wherein said graphical user interface is not a direct Internet application.

* * * * *